United States Patent
Radakovic et al.

(10) Patent No.: US 8,565,474 B2
(45) Date of Patent: Oct. 22, 2013

(54) PARAGRAPH RECOGNITION IN AN OPTICAL CHARACTER RECOGNITION (OCR) PROCESS

(75) Inventors: Bogdan Radakovic, Redmond, WA (US); Sasa Galic, Seattle, WA (US); Aleksandar Uzelac, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 12/720,992

(22) Filed: Mar. 10, 2010

(65) Prior Publication Data

US 2011/0222773 A1 Sep. 15, 2011

(51) Int. Cl.
*G06K 9/00* (2006.01)

(52) U.S. Cl.
USPC ............................ 382/100; 382/175; 382/321

(58) Field of Classification Search
None
See application file for complete search history.

(56) References Cited

U.S. PATENT DOCUMENTS

| | | | |
|---|---|---|---|
| 5,754,685 A | 5/1998 | Takahashi et al. | |
| 5,892,842 A | 4/1999 | Bloomberg | |
| 6,021,218 A | 2/2000 | Capps et al. | |
| 6,438,564 B1 | 8/2002 | Morton et al. | |
| 7,315,867 B2 | 1/2008 | Kobayashi et al. | |
| 7,765,471 B2 * | 7/2010 | Walker | 715/245 |
| 7,777,729 B2 * | 8/2010 | Clary | 345/173 |
| 7,792,362 B2 * | 9/2010 | Berkner et al. | 382/176 |
| 2003/0007397 A1 | 1/2003 | Kobayashi et al. | |
| 2007/0237428 A1 | 10/2007 | Goodwin et al. | |
| 2009/0144605 A1 * | 6/2009 | Radakovic et al. | 715/200 |
| 2009/0144614 A1 * | 6/2009 | Dresevic et al. | 715/239 |

FOREIGN PATENT DOCUMENTS

| | | |
|---|---|---|
| CN | 101441713 A | 5/2009 |
| CN | 101443790 A | 5/2009 |
| CN | 101458770 A | 6/2009 |

OTHER PUBLICATIONS

Esposito, et al., "A Knowledge-Based Approach to the Layout Analysis" Retrieved at << http://citeseerx.ist.psu.edu/viewdoc/download?doi=10.1.1.105.411&rep=rep1&type=pdf >>, Proceedings of the Third International Conference on Document Analysis and Recognition (ICDAR '95),1995, pp. 466-471.

Bloomberg, et al., "Document Image Summarization without OCR" Retrieved at << http://www.parc.com/content/attachments/document_image_summarization_3013_parc.pdf >>,Proceedings of the International Conference on Image Processing, vol. 2, 1996, pp. 229-232.

Payne, et al., "Document Segmentation using Texture Analysis" Retrieved at << http://bucks.ac.uk/pdf/Payne94-ICPR-off-IEEE.pdf >>, ICPR IEEE, vol. 1818, 1994, pp. 380-382.

(Continued)

*Primary Examiner* — Shefali Goradia
(74) *Attorney, Agent, or Firm* — Mayer & Williams, PC

(57) ABSTRACT

An image processing apparatus for detecting paragraphs in a textual image includes an input component for receiving an input image in which textual lines and words have been identified and a page classification component for classifying the input image as a first or second page type. The apparatus also includes a paragraph detection component for classifying all textual lines on the input image as a beginning paragraph line or a continuation paragraph line. The apparatus is also provided with a paragraph creation component for creating paragraphs that include textual lines between two successive beginning paragraph lines, including a first of the two successive beginning paragraph lines. The paragraphs that have been identified may be classified by the type of alignment they exhibit. For instance, paragraphs may be classified according to whether they are left aligned, right aligned, center aligned or justified.

20 Claims, 5 Drawing Sheets

(Text fragment (footer & header) interruption on two consecutive pages of the document)

(56) References Cited

OTHER PUBLICATIONS

Srihari, Sargur N, "From Pixels to Paragraphs: The Use of Contextual Models in Text Recognition" Retrieved at << http://www.cedar.buffalo.edu/~srihari/papers/ICDAR93-Contextual.pdf >>, Proceedings of the Second International Conference on Document Analysis and Recognition, Oct. 20-22, 1993, pp. 416-423.

International Search Report from corresponding PCT Application No. PCT/US2011/027533, dated Oct. 26, 2011, 9 pages.

Chinese Search Report issued May 24, 2013 in connection with corresponding Chinese Patent Application No. 201180013187.3 (2 pages total).

* cited by examiner

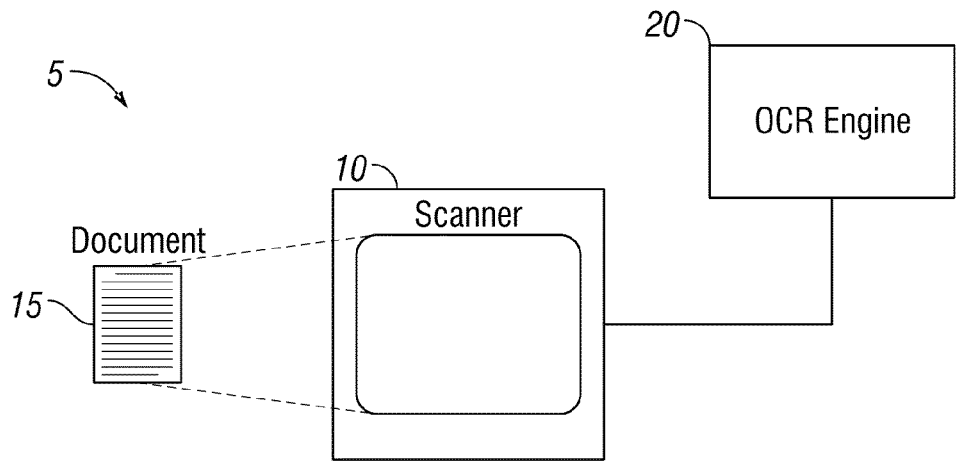

FIG. 1

*Definition 1:* Line break is a position in text flow which defines transition from one line to another.

*Definition 2:* Hard line break is a position in the text flow which mandates the transition to new line independent of text formatting and rendering.

FIG. 2

Definition 1: Line break is a position in text flow which defines transition from one line to another.

Definition 2: Hard line break is a position in the text flow which mandates the transition to new line independent of text formatting and rendering.

FIG. 3 be the prototype of some of his finest work in *The Gentleman Usher* and *Monsieur D' Olive*.

*The Gentleman Usher* marks the triumph of poetic and romantic comedy in Chapman's work. Mr. Swin- ¹ *Journal of Germanic Philology*, vol. 2, pp. 7-13.

𝔍ntroduction                                      xxv burne notes that this play is "distinguished from all Chapman's other works by the serious grace and sweetness of the love-scenes, and the higher tone of feminine character and masculine regard which is sustained

FIG. 4
(Text fragment (footer & header) interruption on two consecutive pages of the document)

---

Definition 3: Paragraph is a set of lines delimited with hard line break before the first line (except the first paragraph) and hard line break after the last line (except the last paragraph). No more hard line breaks exist between these two.

Definition 3: Paragraph is a set of lines delimited with hard line break before the first line (except the first paragraph) and hard line break after the last line (except the last paragraph). No more hard line breaks exist between these two.

*Definition 3:* Paragraph is a set of lines delimited with hard line break before the first line (except the first paragraph) and hard line break after the last line (except the last paragraph). No more hard line breaks exist between these two.

*Definition 3:* Paragraph is a set of lines delimited with hard line break before the first line (except the first paragraph) and hard line break after the last line (except the last paragraph). No more hard line breaks exist between these two.

110 — Classify Input Page as "Poem" or "Text" Page

120 — Classify Textual Lines as a "Beginning Paragraph Line" or a "Continuation Paragraph Line"

130 — Create Paragraphs Between Two Successive "Beginning Paragraph Lines"

FIG. 9

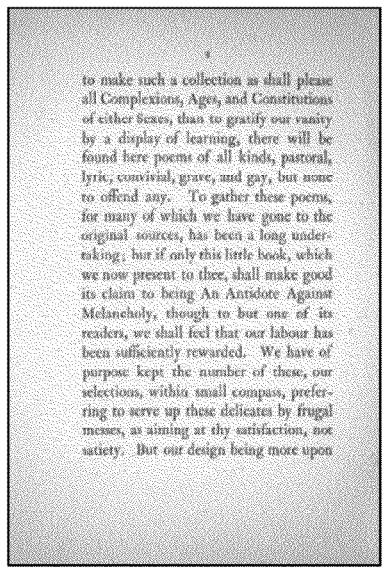
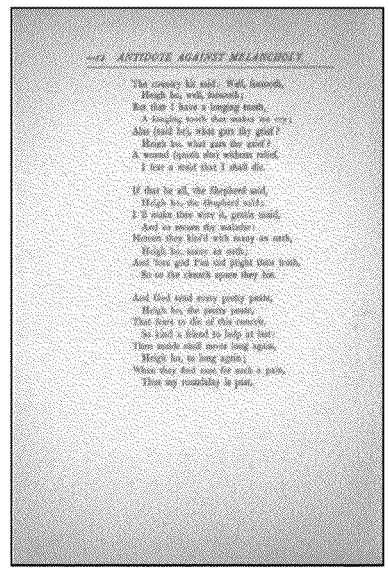
*FIG. 10A*  *FIG. 10B*
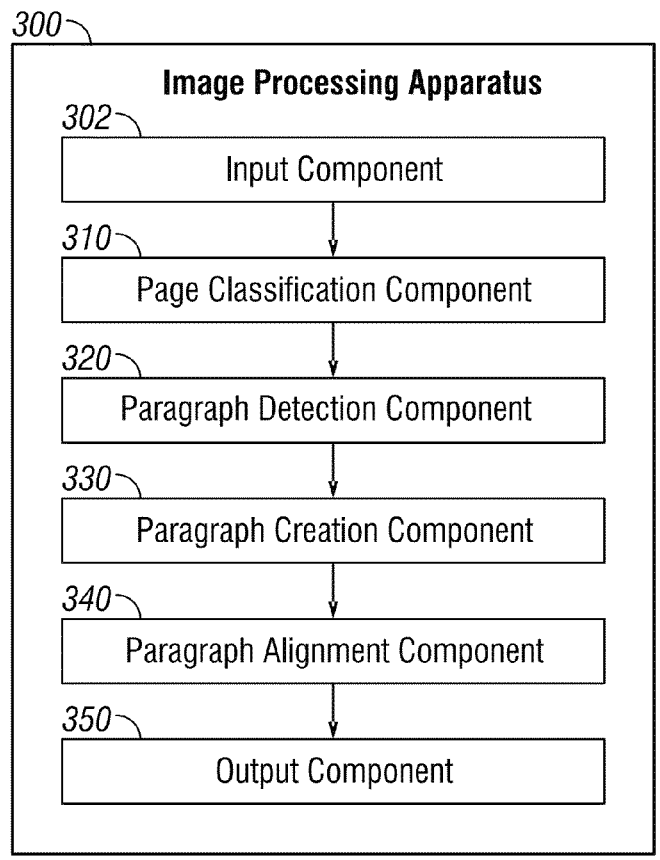
*FIG. 11*

PEOPLE'S WILL

On March 1, 1881, when Vladimir was ten years old, a dramatic event rocked Russia. Bombers set off two explosions near Czar Alexander's carriage outside his palace in Saint Petersburg. The second explosion killed the czar.

The bombers belonged to a radical group called People's Will. Its goal was to topple the entire Russian political system and replace it with a more fair and just government. People's Will believed that once the

*FIG. 12*

PARAGRAPH RECOGNITION IN AN OPTICAL CHARACTER RECOGNITION (OCR) PROCESS

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is obtained from a book or when it is generated by an imager-based scanner, because in these cases the text/picture is scanned from a distance, from varying orientations, and in varying illumination. Even if the performance of scanning process is good, the performance of the OCR engine may be degraded when a relatively low quality page of text is being scanned. Accordingly, many individual processing steps are typically required to perform OCR with relatively high quality.

SUMMARY

One aspect of an Optical Character Recognition (OCR) process involves paragraph detection. Paragraph detection will typically be performed after textual lines in a textual image have been identified by the coordinates of their respective bounding boxes. In one implementation, the paragraph detection process classifies all textual lines on the page into one two classes: a "beginning paragraph line" class and a "continuation paragraph line" class. A beginning paragraph line follows a line with a hard break and a continuation paragraph line follows a line with a break that is not a hard break. Individual paragraphs are then identified. Each paragraph includes all lines located between two successive beginning paragraph lines, as well as a first of the two successive beginning paragraph lines.

In one particular implementation, prior to classifying the textual lines, the paragraph detection process classifies each input page into one of two classes in accordance with the layout of the lines on the page. These classes are a poem page class (representing a page that includes poetry) and a text page class (which represents a page that includes prose).

In another particular implementation, the paragraphs that have been identified are classified by the type of alignment they exhibit. For instance, paragraphs may be classified according to whether they are left aligned, right aligned, center aligned or justified.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 shows one illustrative example of a system for performing optical character recognition (OCR) on a textual image.

FIGS. 2 and 3 each show two paragraphs for the purpose of illustrating the meaning of a line break or a hard line break.

FIG. 4 shows a text fragment that is interrupted by a header and footer.

FIG. 5 shows an example of a left aligned paragraph.

FIG. 6 shows an example of a right aligned paragraph.

FIG. 7 shows an example of a center aligned paragraph.

FIG. 8 shows an example of a justified paragraph.

FIG. 9 is a flowchart showing one example of a paragraph detection process.

FIGS. 10a and 10b show an example of a text page and a poem page, respectively.

FIG. 11 shows one example of an image processing apparatus that may perform paragraph detection.

FIG. 12 shows an illustrative portion of text in which the line classification component has classified each line as a beginning paragraph line or a continuation paragraph line, as denoted by the letters "B" or "C" at the beginning of each line.

DETAILED DESCRIPTION

FIG. 1 shows one illustrative example of a system 5 for optical character recognition (OCR) of a textual image. The system 5 includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

The OCR engine 20 receives a textual image as a bitmap of text lines. The image may be a scanned image of text or a digital document such as a PDF or Microsoft Word document, where input data is already available. If such input data is not available, the paragraph detection component of an OCR engine is assumed to receive as input from other components of the OCR engine an image in which a list of textual lines (and possibly words) have already been identified for each page of the image. Individual lines and words are defined by line and word bounding boxes, respectively. The bounding boxes themselves are defined by a set of coordinates that are established for each. Thus, information is available concerning how words are organized into lines and lines into regions to establish the line reading order.

Paragraph detection can be a difficult aspect of the OCR process for a number of reasons. First, the OCR process does not perform any semantic analyses on the extracted content. In addition, the quality of the input image received by the paragraph detection component will generally not be perfect. For instance, some words and numbers may be misidentified and some lines may even be missed altogether. Pages may also be cropped and the position of the cropping box relative to the page may not be constant. Furthermore, different paragraphs within a single image or page may have different characteristics, such as different alignments, for example. Accordingly, the paragraph detection process can produce different results for different types of input pages. Finally, the paragraphs themselves may have complex structures. For example, a paragraph may span across multiple columns or pages and/or contain bulleted lists or the like.

Before proceeding to describe the paragraph recognition process a number of definitions regarding paragraphs will be introduced, bearing in mind that different definitions for a paragraph could be used from those presented herein by way of illustration only.

Definition 1

A line break is a position in the flow of text which defines a transition from one line to another.

Definition 2

A hard line break is a position in the flow of text which mandates the transition to a new line independently of text formatting and rendering (e.g. changing the font size in a Microsoft Word document).

These definitions may be better understood with reference to the example in FIG. 2, which contains two paragraphs. The first paragraph consists of one line with one line break. The second paragraph consists of 2 lines with 2 line breaks. FIG. 3 shows the same two paragraphs as in FIG. 2. However, in FIG. 3 the font size has been increased while keeping the page margins the same.

The first paragraph in FIG. 3 consists of 2 lines with 2 line breaks, and the second paragraph consists of 3 lines with 3 line breaks. Thus, after increasing the font size two line breaks have remained the same (one after the word "another." and the other after the word "rendering."). Based on this information it is clear that that there are two hard line breaks which are independent of text formatting and that all other line breaks are the result of text rendering.

Definition 3

A paragraph is a set of lines delimited with a hard line break before the first line (except for the first paragraph in the document) and a hard line break after the last line (except for the last paragraph). No additional hard line breaks exist between these two hard line breaks.

One additional point should be emphasized. A paragraph should be viewed in the context of an uninterrupted flow of text. A single paragraph cannot be split, which implies that paragraphs should be a continuous set of lines. All text fragments that logically interrupt the normal text flow should not be considered as part of the uninterrupted text stream that is included in the paragraph. An example of an interruption in a text fragment is given in FIG. 4.

Clearly, the last paragraph on the bottom of the first page shown at the top of FIG. 4 is interrupted with a footer (a footnote in this example). Likewise, this same paragraph is then again interrupted with a header on the top of the second page. The header and footer are text fragments that do not belong to the text stream of the paragraph should be excluded when detecting "wrapping" paragraph (i.e. paragraphs that span across two or more pages. Information about text fragments that interrupt the flow of text flow (e.g., headers, footnotes, image captions, etc) is contained within the information made available to the paragraph component from other components of the OCR engine. Such information falls into the category of information that is used to establish lines reading order, which was mentioned above.

One aspect of paragraph detection is the detection of paragraph alignment. The possible arrangements for paragraph alignment are:
Left
Right
Center
Justified An example of a left aligned paragraph is shown in FIG. 5. Left aligned paragraphs satisfy the following conditions. A left aligned paragraph satisfies the following two conditions.
1) All lines after the first one have the same left margin (see line 410 in FIG. 5).
2) The width of the first word plus it adjacent whitespace is greater than the right indentation of the previous line (i.e. the distance from the last word in the previous line to that line's right margin, which is denoted by line 420 in FIG. 5).

In FIG. 5 the second condition is satisfied because the word "except" plus its adjacent whitespace is greater than the distance from the word "line" in the previous line to the right margin.

An example of a right aligned paragraph is shown in FIG. 6. A right aligned paragraph satisfies the following conditions:
1) All lines after the first one have the same right margin (see line 520 in FIG. 6).
2) The width of the first word plus its adjacent whitespace is greater than the left indentation of the previous line (i.e., the distance from the first word in the previous line to its left margin, which is denoted by line 510 in FIG. 6).

In FIG. 6 the second condition is satisfied because the word "except" plus its adjacent whitespace is greater than the distance from the word "Definition" in the previous line to the left margin.

A center aligned paragraph satisfies the following condition:
1) All lines are center aligned (i.e., the distances of the leftmost and rightmost words in a line from the left and right margins, respectively, are the same). An example of a centered aligned paragraph is shown in FIG. 7.

An example of a justified paragraph is shown in FIG. 8. A justified paragraph satisfies the following conditions:
1) All lines after the first one have the same left margin (see line 610 in FIG. 8).
2) All lines before the last one have the same right margin (see line 620 in FIG. 8).

Given the aforementioned definitions, the paragraph detection process may now be described with reference to the flowchart in FIG. 9. The process begins in step 110 by classifying each input page into one of two classes in accordance with the layout of the lines on the page: a "poem page" class and a "text page" class. Next, in step 120, the paragraph detection component classifies all textual lines on the page into one two classes: a "beginning paragraph line" class and a "continuation paragraph line" class. Finally, in step 130 all lines between two successive "beginning paragraph lines" are deemed to create one paragraph (not including the second "beginning paragraph line"). Paragraph alignment is detected after the OCR engine detects paragraphs.

An example of a text page is shown in FIG. 10a and an example of a poem page is shown in FIG. 10b.

FIG. 11 shows one example of an image processing apparatus 300 that may perform the paragraph detection process. The apparatus 300, which may be incorporated in an OCR engine, can be used by the OCR engine to detect and classify paragraphs in a textual image. The apparatus includes an input component 302 for receiving an input image and a page classification component 310 for classifying each input page as a "poem page" class or a "text page." A paragraph detection component 320 classifies all textual lines on the page as a "beginning paragraph line" or a "continuation paragraph line." The apparatus 300 also includes a paragraph creation component 330, which creates paragraphs between two consecutive beginning paragraph lines, and a paragraph alignment component 340 that determines the manner in which the paragraphs are aligned. The apparatus 300 also includes an output component 350 that generates the information concerning the paragraphs in a form that allows it to be employed by subsequent components of the OCR engine.

Page Classification

The first step is the classification of pages into one of two predefined classes: a "poem page" class and a "text page" class. This classification process may be accomplished by examining some or all of the features listed below, each of which are more likely indicative that the page is a poem page or a text page. It should be noted that no single feature is likely to be dispositive. Rather, it is the aggregate of the evidence provided by all the features which is important. It should also be noted that this list of features is not exhaustive but is presented by way of example only.

1. The relative number of lines that begin with a minuscule, a lower case letter.
2. The relative number of lines that end with a number (i.e., the last word is a number).
3. The relative number of lines that end with no alphanumeric characters (but rather end with punctuation marks like '.', ',', ';' ... etc).
4. The density of line height (calculated by using the page height, text height and the number of lines on the page).
5. The relative number of lines that are middle lines of some large portion of text (e.g., middle lines of justified paragraphs).

The above definitions that employ a relative number of lines refers to the number of lines that satisfy some condition divided by the total number of lines on the page. The density of line height can be defined, for example, as the page height divided by the product of the text height and the number of lines on the page.

In general, a page is more likely to be a text page as the values for the items 1, 4 and 5 noted above increase, whereas an increase in the values for items 2 and 3 is more indicative of a poem page. The weight that should be given to various values of the above factors when performing the classification process may be determined using training patterns to establish various combinations of feature values that characterize a poem and a text page. Once this has been determined, the values for these features may be used to classify pages of an unknown type undergoing OCR. While the greatest accuracy will generally be achieved from an examination of all of these features, in some cases an examination of various sub-combinations may be sufficient. The paragraph detection component can employ a machine learning technique such as a neural network or a decision tree to improve the accuracy of the classification process.

Line Classification

The classification process for classifying each textual line as a beginning paragraph line or a continuation paragraph line may be accomplished by examining some or all of the features listed below, each of which are more likely indicative that the line is a beginning paragraph line or continuation paragraph line. A beginning paragraph line is a line that follows a hard break, whereas a continuation paragraph line is a line that follows a line break which is not a hard break. Once again, it should be noted that no single feature is likely to be dispositive. Rather, it is the aggregate of the evidence provided by all the features which is important. It should also be noted that this list of features is not exhaustive but is presented by way of example only. For clarity, however, the complete set of features enumerated immediately below is referred to as the Primary Line Feature Set. In some implementations a simple majority of the features in the Primary Line Feature Set may be employed. In general these features classify the textual lines as a beginning paragraph line or a continuation paragraph line based at least in part on a layout of each textual line relative to the other textual lines on the page of the image.

The precise classification process used on a poem page will generally be different from the process used on a text page. However, the features that are used may be the same for both. That is, both may use the Primary Line Feature Set, which is defined by the following features that characterize individual lines:

1. Is the line the first line on the page.
2. Does the previous line begin with a bullet symbol.
3. Does the current line beginning with a bullet symbol.
4. Does the next line begin with a bullet symbol.
5. Does the previous line begin with a capital letter.
6. Does the current line begin with a capital letter.
7. Does the next line begin with a capital letter.
8. Does the previous line begin with a minuscule, a lower case letter.
9. Does the current line begin with a minuscule, a lower case letter.
10. Does the next line begin with a minuscule, a lower case letter.
11. The relative character width for the current and the previous line. If the character width for the current line is CW and character width for the previous line is PW then this value is:

$$\left| \frac{CW - PW}{CW} \right|$$

12. The relative character width for the current and the next line. If the character width for the current line is CW and character width for the next line is NW then this value is:

$$\left| \frac{CW - NW}{CW} \right|$$

13. The relative character height for the current and the previous line. If the character height for the current line is CH and character height for the previous line is PH then this value is:

$$\left| \frac{CH - PH}{CH} \right|$$

14. The relative character height for the current and the next line. If the character height for the current line is CH and character height for the next line is NH then this value is:

$$\left| \frac{CH - NH}{CH} \right|$$

15. The relative left indentation for the current and the previous line. If the medium character width for the current line is MCW and left indentation for the current and previous line are LIC and LIP then this value is:

$$\left|\frac{LIC - LIP}{MCW}\right|$$

16. The relative left indentation for the current and the next line. If the medium character width for the current line is MCW and left indentation for the current and the next line are LIC and LIN then this value is:

$$\left|\frac{LIC - LIN}{MCW}\right|$$

17. The relative left indentation for the previous and the next line. If the medium character width for the current line is MCW and left indentation for the previous and the next line are LIP and LIN then this value is:

$$\left|\frac{LIP - LIN}{MCW}\right|$$

18. The current line has bigger left coordinate than the previous line.
19. The current line has bigger left coordinate than the next line.
20. The relative right indentation for the current and the previous line. If the medium character width for the current line is MCW and right indentation for the current and the previous line are RIC and RIP then this value is:

$$\left|\frac{RIC - RIP}{MCW}\right|$$

21. The relative right indentation for the current and the next line. If the medium character width for the current line is MCW and right indentation for the current and the next line are RIC and RIN then this value is:

$$\left|\frac{RIC - RIN}{MCW}\right|$$

22. The relative right indentation for the previous and the next line. If the medium character width for the current line is MCW and right indentation for the previous and the next line are RIP and RIN then this value is:

$$\left|\frac{RIP - RIN}{MCW}\right|$$

23. The current line has greater right coordinate value than the previous line.
24. The current line has a greater right coordinate value than the next line.
25. The relative distance between the current and the previous line. If the medium character height for the current line is MCH and distance between the current and the previous line is DCP then this value is:

$$\left|\frac{DCP}{MCH}\right|$$

26. The relative distance between the current and the next line. If the medium character height for the current line is MCH and distance between the current and the next line is DCN than this value is:

$$\left|\frac{DCN}{MCH}\right|$$

27. The distance ratio between the previous and the next line:

$$\left|\frac{DCP}{DCN}\right|$$

28. The previous line ends with a hyphen symbol.
29. The previous line ends with a non alpha numeric character (e.g. '.', '?', '!', ';' etc).
30. The current line ends with a non alpha numeric character (e.g. '.', '?', '!', ';' etc).
31. The next line ends with non alpha numeric character (e.g. '.', '?', '!', ';' etc).
32. The ratio of the center positions for the previous and the current line. If the center position of the current line is CC and center position for the previous line is PC then this value is:

$$\left|\frac{PC}{CC}\right|$$

33. The ratio of the center positions for the current and the next line. If the center position of the current line is CC and center position for the next line is NC then this value is:

$$\left|\frac{CC}{NC}\right|$$

34. The relative left indentation for the previous line. If the distance from the previous line left to the region left (i.e. a region such as a column where the previous line belongs) is DPL and the medium character width for the current line within the region is MCWR then this value is:

$$\left|\frac{DPL}{MCWR}\right|$$

35. The relative left indentation for current line. If the distance from the current line left to the region left (a region such as a column to which the current line belongs) is DL and the medium character width for the current line within the region is MCWR then this value is:

$$\left|\frac{DL}{MCWR}\right|$$

36. The relative left indentation for the next line. If the distance from the next line left to the region left (a region such as a column to which the next line belongs) is DNL and the medium character width for the current line within the region is MCWR then this value is:

$$\left|\frac{DNL}{MCWR}\right|$$

37. The relative right indentation for the previous line. If the distance from the previous line right to the region right (a region such as a column to which the previous line belongs) is DPR and the medium character width for the current line within the region is MCWR then this value is:

$$\left|\frac{DPR}{MCWR}\right|$$

38. The relative right indentation for the current line. If the distance from the current line right to the region right (a region such as a column to which the current line belongs) is DR and the medium character width for the current line within the region is MCWR then this value is:

$$\left|\frac{DR}{MCWR}\right|$$

39. The relative right indentation for the next line. If the distance from the next line right to the region right (the region such as a column to which the next line belongs) is DNR and the medium character width for the current line within the region is MCWR then this value is:

$$\left|\frac{DNR}{MCWR}\right|$$

40. Is the current line the beginning of a new text region.
41. Is the first word width of the current line greater than or equal to the previous line right indentation.
42. Is there an image region on the left side of the line.
43. Is there an image region on the right side of the line.
44. Is there an image region above the current line and is the previous line in the same text region as the current line.
45. The relative region width ratio for the current and the previous line. If the region width of the current line is CRW and region width of the previous line is PRW then this value is:

$$\left|\frac{PRW}{CRW}\right|$$

46. Is the previous line classified as a "beginning paragraph line" or a "continuation paragraph line".
47. Are all letters capitalized in the current line.
48. Are all letters capitalized in the previous line.
49. Are all letters capitalized in the next line.
50. The number of words in the current line.
51. The number of words in the previous line.
52. The number of words in the next line.
53. The median number of words per line.
54. Does the current line end with a number.
55. Does the previous line end with a number.
56. Does the next line end with a number.

The weight that should be given to various values of the above factors when performing the line classification process may be determined using training patterns to establish various combinations of feature values that characterize a beginning paragraph line and a continuation paragraph line. Once this has been determined, the values for these features may be used to classify lines of an unknown type undergoing OCR. While the greatest accuracy will generally be achieved from an examination of all of these features, in some cases an examination of various sub-combinations may be sufficient. For instance, as previously mentioned, in some implementations a simple majority of the features in the Primary Line Feature Set may be employed. The line classification component can employ a machine learning technique such as a neural network, decision tree or a Bayesian framework to improve the accuracy of the classification process.

Paragraph Creation

The paragraph creation component creates paragraphs between a beginning paragraph line and the next appearing beginning paragraph line. That is, a paragraph includes a beginning paragraph line and all lines before the next subsequent beginning paragraph line. FIG. 12 shows an illustrative portion of text in which the line classification component has classified each line as a beginning paragraph line or a continuation paragraph line, as denoted by the letters "B" or "C" at the beginning of each line. In this manner three paragraphs are created in FIG. 12.

Paragraph Alignment

After the paragraphs have been created, the paragraph alignment component determines their alignment. This process, which classifies each paragraph as left or right aligned, justified, or center aligned, may be accomplished by examining some or all of the features listed below, each of which are more likely indicative that the paragraph falls into one of the four categories. Once again, it should be noted that no single feature is likely to be dispositive. Rather, it is the aggregate of the evidence provided by all the features which is important. It should also be noted that this list of features is not exhaustive but is presented by way of example only.

Illustrative features that may be used for alignment detection include:
1. The number of lines in the paragraph.
2. Paragraph lines are left aligned. All paragraph lines after the first one have the same left margin.
3. Paragraph lines are right aligned. All paragraph lines after the first one have the same right margin.
4. Paragraph lines are center aligned. All paragraph lines have the same center coordinate.
5. Left region indentation. Distance from the left edge of the paragraph to the region (e.g. column) left.
6. Right region indentation. Distance from the right paragraph edge to the region right.
7. Center position of the paragraph within its region.
8. Left page indentation. Distance from the left edge of the paragraph to the page left.
9. Right page indentation. Distance from the right edge of the paragraph to the page right.
10. Center position of the paragraph within the page.
11. The presence or absence of an image region on the left side of the paragraph.
12. The presence or absence of an image region on the right side of the paragraph.
13. The calculated alignment value for the previous paragraph.

The weight that should be given to various values of the above factors when performing the paragraph alignment classification process may be determined using training patterns to establish various combinations of feature values that characterize paragraph alignment. Once this has been determined, the values for these features may be used to classify paragraph alignment of an unknown type undergoing OCR. While the greatest accuracy will generally be achieved from an examination of all of these features, in some cases an examination of various sub-combinations may be sufficient. The paragraph alignment classification component can employ a machine learning technique such as a neural network, decision tree or a Bayesian framework to improve the accuracy of the classification process.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An image processing apparatus for detecting paragraphs in a textual image, comprising:
   an input component for receiving an input image in which textual lines and words have been identified;
   a page classification component for classifying the input image as a first or second page type;
   a paragraph detection component for classifying all textual lines on the input image as a beginning paragraph line or a continuation paragraph line; and
   a paragraph creation component for creating paragraphs that include textual lines between two successive beginning paragraph lines, including a first of the two successive beginning paragraph lines.

2. The image processing apparatus of claim 1 further comprising a paragraph alignment component for classifying each of the paragraphs according to its alignment.

3. The image processing apparatus of claim 2 wherein the paragraph alignment component is configured to classify each of the paragraphs according to whether it is left aligned, right aligned, center aligned or justified.

4. The image processing apparatus of claim 3 wherein the paragraph alignment component is configured to classify each of the paragraphs based at least in part on features that include: a number of lines in a paragraph; whether the lines in a paragraph are left aligned; whether lines in a paragraph after a first line have a common left margin; whether lines in a paragraph are right aligned; whether all lines in a paragraph after the first line have a common right margin; whether lines in a paragraph are center aligned; whether all lines in a paragraph have a common center coordinate; an indentation value of a left region; an indentation value of a right region; a distance from a paragraph right edge to a right region; a center position of the paragraph within a region on a page of the image; a left page indentation; a right page indentation; a center position of a paragraph within the page; presence or absence of an image region on a left or right side of a paragraph; and a calculated alignment value of a previous paragraph.

5. The image processing apparatus of claim 1 wherein the first page type is a poem page and the second page type is a text page.

6. The image processing apparatus of claim 5 wherein the page classification component is configured to classify the input image as a poem or text page based at least in part on features of the textual lines which include: a relative number of lines on the image that begin with a minuscule; a relative number of lines that end with a number; a relative number of lines that do not end with an alphanumeric characters; a density of line height; and a relative number of lines that are middle lines within a selected portion of the image.

7. The image processing apparatus of claim 1 wherein the paragraph detection component is configured to classify all textual lines on the input image as a beginning paragraph line or a continuation paragraph line based at least in part on a Primary Line Feature Set.

8. The image processing apparatus of claim 7 wherein the paragraph detection component is configured to classify all textual lines on the input image as a beginning paragraph line or a continuation paragraph line based at least in part on a majority of features in a Primary Line Feature Set.

9. A method for detecting paragraphs in a textual image, comprising:
   receiving an input image in which textual lines and words have been identified;
   classifying the input image as a first or second page type;
   classifying all textual lines on the input image as a beginning paragraph line or a continuation paragraph line; and
   creating paragraphs that include textual lines between two successive beginning paragraph lines, including a first of the two successive beginning paragraph lines.

10. The method of claim 9 further comprising classifying each of the paragraphs according to a manner in which it is aligned.

11. The method of claim 9 wherein the first page type is a poem page and the second page type is a text page.

12. The method of claim 9 wherein classifying the image includes classifying the input image as a poem or text page based at least in part on features of the textual lines which include: a relative number of lines on the image that begin with a minuscule; a relative number of lines that end with a number; a relative number of lines that do not end with an alphanumeric characters; a density of line height; and a relative number of lines that are middle lines within a selected portion of the image.

13. The method of claim 9 wherein classifying all textual lines includes classifying all textual lines on the input image as a beginning paragraph line or a continuation paragraph line based at least in part on a Primary Line Feature Set.

14. The method of claim 9 wherein classifying all textual lines includes classifying all textual lines on the input image as a beginning paragraph line or a continuation paragraph line based at least in part on a majority of features in a Primary Line Feature Set.

15. The method of claim 14 wherein the each of the paragraphs is classified according to whether it is left aligned, right aligned, center aligned or justified and further classifying each of the paragraphs based at least in part on features that include: a number of lines in a paragraph; whether the lines in a paragraph are left aligned; whether lines in a paragraph after a first line have a common left margin; whether lines in a paragraph are right aligned; whether all lines in a paragraph after the first line have a common right margin; whether lines in a paragraph are center aligned; whether all lines in a paragraph have a common center coordinate; an indentation value of a left region; an indentation value of a right region; a distance from a paragraph right edge to a right region; a center position of the paragraph within a region on a page of the image; a left page indentation; a right page indentation; a center position of a paragraph within the page; presence or absence of an image region on a left or right side of a paragraph; and a calculated alignment value of a previous paragraph.

16. One or more computer-readable storage media storing a computer program executable by a computing system for configuring the computing system to perform a method for detecting paragraphs in an input image that includes text undergoing optical character recognition, comprising:
receiving an input image;
identifying textual lines in the image;
classifying all textual lines on the input image as a beginning paragraph line or a continuation paragraph line based at least in part on a page layout of each page of the image; and
creating paragraphs that include textual lines between two successive beginning paragraph lines, including a first of the two successive beginning paragraph lines.

17. The one or more computer-readable storage media of claim 16 further comprising classifying each of the paragraphs according to a manner in which it is aligned.

18. The one or more computer-readable storage media of claim 16 wherein the layout is a poem page layout or a text page layout.

19. The one or more computer-readable storage media of claim 16 further comprising determining the page layout as a poem page layout or text page layout.

20. The one or more computer-readable storage media of claim 19 wherein determining the page layout includes classifying the input image as a poem page or text page layout based at least in part on features of the textual lines which include: a relative number of lines on the image that begin with a minuscule; a relative number of lines that end with a number; a relative number of lines that do not end with an alphanumeric characters; a density of line height; and a relative number of lines that are middle lines within a selected portion of the image.

* * * * *